US008208909B2

(12) United States Patent
Snapp et al.

(10) Patent No.: US 8,208,909 B2
(45) Date of Patent: Jun. 26, 2012

(54) SYSTEM, APPARATUS AND METHOD FOR AVAILING A MOBILE CALL OF ADDRESS INFORMATION

(75) Inventors: John Lawrence Snapp, Westminster, CO (US); Stephen Marc Meer, Longmont, CO (US); Robin Erkkila, Lafayette, CO (US)

(73) Assignee: West Corporation, Omaha, NE (US)

( * ) Notice: Subject to any disclaimer, the term of this patent is extended or adjusted under 35 U.S.C. 154(b) by 1059 days.

(21) Appl. No.: 12/131,198

(22) Filed: Jun. 2, 2008

(65) Prior Publication Data

US 2009/0298492 A1 Dec. 3, 2009

(51) Int. Cl.
*H04L 9/06* (2006.01)
(52) U.S. Cl. ............... 455/414.3; 455/414.2; 455/456.1; 455/456.2; 455/456.3; 455/404.2; 379/45; 340/573.1; 340/539; 340/825.49
(58) Field of Classification Search ............... 455/456.2, 455/456.1, 456.3, 404.2, 423, 404.3, 414.3; 340/539.13, 825.49, 573.1, 39.13; 707/6; 379/45
See application file for complete search history.

(56) References Cited

U.S. PATENT DOCUMENTS

| | | | |
|---|---|---|---|
| 4,683,195 A | 7/1987 | Mullis et al. | 435/6 |
| 4,683,202 A | 7/1987 | Mullis | 435/91 |
| 4,775,619 A | 10/1988 | Urdea | 435/6 |
| 4,876,187 A | 10/1989 | Duck et al. | 435/6 |
| 4,965,188 A | 10/1990 | Mullis et al. | 435/6 |
| 5,011,769 A | 4/1991 | Duck et al. | 435/6 |
| 5,118,605 A | 6/1992 | Urdea | 435/6 |
| 5,210,015 A | 5/1993 | Gelfand et al. | 435/6 |
| 5,403,711 A | 4/1995 | Walder et al. | 435/6 |
| 5,427,930 A | 6/1995 | Birkenmeyer et al. | 435/91.52 |
| 5,470,705 A | 11/1995 | Grossman et al. | 435/6 |
| 5,494,810 A | 2/1996 | Barany et al. | 435/91.52 |
| 5,514,543 A | 5/1996 | Grossman et al. | 435/6 |
| 5,703,222 A | 12/1997 | Grossman et al. | 536/24.3 |
| 5,777,096 A | 7/1998 | Grossman et al. | 536/24.3 |
| 5,807,682 A | 9/1998 | Grossman et al. | 435/6 |
| 5,846,717 A | 12/1998 | Brow et al. | 435/6 |
| 5,882,867 A | 3/1999 | Ullman et al. | 435/6 |
| 5,916,426 A | 6/1999 | Madabhushi et al. | 204/451 |
| 5,952,174 A | 9/1999 | Nikiforov et al. | 435/6 |
| 5,985,557 A | 11/1999 | Prudent et al. | 435/6 |
| 5,994,069 A | 11/1999 | Hall et al. | 435/6 |
| 6,001,567 A | 12/1999 | Brow et al. | 435/6 |
| 6,090,543 A | 7/2000 | Prudent et al. | 435/6 |
| 6,090,606 A | 7/2000 | Kaiser et al. | 435/6 |
| 6,110,677 A | 8/2000 | Western et al. | 435/6 |
| 6,121,001 A | 9/2000 | Western et al. | 435/6 |
| 6,236,365 B1 | 5/2001 | LeBlanc et al. | |
| 6,608,892 B2 | 8/2003 | Shaffer et al. | |
| 6,925,378 B2 | 8/2005 | Tzamaloukas | |
| 6,952,181 B2 | 10/2005 | Karr et al. | |

(Continued)

*Primary Examiner* — Patrick Edouard
*Assistant Examiner* — Fred Casca

(57) ABSTRACT

A system for availing a mobile call of an address set including address information relating to a caller locus includes: (a) an evaluating unit for receiving the call from a caller at the caller locus; an indication of the caller locus including a first measure of certainty being conveyed with the call; and (b) at least one data base coupled with the evaluating unit; the at least one data base containing address location information relating with at least one address associated with the caller; the address location information including a respective second measure of certainty associated with each address; the evaluating unit cooperating with the at least one data base to identify whether a respective address is a selected address satisfying a predetermined relationship between the first and second measures of certainty; each selected address being included in the address set and conveyed to a call receiver.

20 Claims, 6 Drawing Sheets

U.S. PATENT DOCUMENTS

| | | |
|---|---|---|
| 7,107,285 B2 | 9/2006 | von Kaenel et al. |
| 7,136,474 B2 | 11/2006 | Shaffer et al. |
| 7,184,888 B2 | 2/2007 | Furukawa |
| 7,203,300 B2 | 4/2007 | Shaffer et al. |
| 7,263,438 B2 | 8/2007 | Furukawa |
| 2004/0210386 A1* | 10/2004 | Wood et al. .................. 701/208 |
| 2006/0160523 A1* | 7/2006 | Erskine et al. ................ 455/405 |
| 2006/0276201 A1 | 12/2006 | Dupray |
| 2007/0096900 A1* | 5/2007 | Contractor ............... 340/539.13 |
| 2009/0077077 A1* | 3/2009 | Geldenbott et al. ............. 707/6 |
| 2009/0092232 A1* | 4/2009 | Geldenbott et al. ........... 379/45 |
| 2009/0215427 A1* | 8/2009 | Hawkins .................... 455/404.2 |

\* cited by examiner

SYSTEM, APPARATUS AND METHOD FOR AVAILING A MOBILE CALL OF ADDRESS INFORMATION

FIELD OF THE INVENTION

The present invention is directed to telecommunication systems, apparatuses and methods. The invention is especially directed to systems, apparatuses and methods for providing information identifying an address associated with a phone instrument (hereinafter referred to as "the caller") placing a call to accompany calls traversing a mobile telecommunications network.

BACKGROUND OF THE INVENTION

Special number calling systems such as 9-1-1 Emergency Service calling systems have originated and developed based upon an assumption that the origination locus of a special number call is known prior to the initiation of the call. This assumption is based on the fact that special number calls were developed based on landline telephony, wherein a telephone number was fixed at one location and thus represented a locus. The specific address and location at an address is associated with every telephone number that supports fully capable special number calling. Identification of residents or other occupants at the respective addresses was also provided. By way of example and not by way of limitation, in a 9-1-1 calling system, addresses and information relating to residents or occupants of respective addresses were provided for use in an Automatic Location Identification (ALI) data base for use by a Public Safety Answering Point (PSAP; sometimes referred to as a Public Safety Answering Position) when responding to an emergency service call.

Placement of special number calls such as, by way of example and not by way of limitation, emergency service calls from a mobile telecommunication device have recently been provided with accompanying identifying information relating to the originating instrument phone number and origin location. Location information may be expressed in terms of X-Y coordinates in a predetermined grid, in terms of Global Positioning System (GPS) coordinates or in other terms understood by or convertible to terms understood by a PSAP.

Known location information is preferably used to route 9-1-1 calls to an appropriate PSAP near the origin of the call. The same information may be used by the PSAP to support the emergency response to the call, such as dispatching fire, police or emergency medical personnel and equipment and for call back to the call originator if necessary. However, the known location information is sometimes, even often, not sufficiently precise to relate address information to an originating locus for a special number call when the call is placed using a mobile phone. Identification of address information relating to a locus may be useful, by way of example and not by way of limitation, when the locus is an apartment building or is near more than one location that may be frequented by a mobile caller. Knowing an address associated with origin of a mobile call may assist emergency responder personnel in rendering timely aid including locating children, elderly persons or other survivors in a fire, building collapse or other emergency situation.

There is a need for a system, apparatus and method for availing a mobile call of address information.

SUMMARY OF THE INVENTION

A system for availing a mobile call of an address set including address information relating to a caller locus includes: (a) an evaluating unit for receiving the call from a caller at the caller locus; an indication of the caller locus including a first measure of certainty being conveyed with the call; and (b) at least one data base coupled with the evaluating unit; the at least one data base containing address location information relating with at least one address associated with the caller; the address location information including a respective second measure of certainty associated with each address; the evaluating unit cooperating with the at least one data base to identify whether a respective address is a selected address satisfying a predetermined relationship between the first and second measures of certainty; each selected address being included in the address set and conveyed with the call to a call receiver.

A method for availing a mobile telecommunication call of a potential address set including address information relating to a caller locus includes: (a) in no particular order: (1) providing an evaluating unit configured for receiving the mobile telecommunication call from a caller at the caller locus; and (2) providing at least one data base coupled with the evaluating unit; the at least one data base containing address location information relating with at least one address associated with the caller; each respective address of the at least one address being situated at a respective address locus; the address location information including a respective second measure of certainty associated with each respective address of the at least one address; (b) conveying an indication of the caller locus with the mobile telecommunication call; the indication including a first measure of certainty associated with the caller locus; (c) operating the evaluating unit cooperatively with the at least one data base to identify whether at least one respective address is a selected address; the selected address satisfying a predetermined relationship between the first measure of certainty and the respective second measure of certainty; each selected address being included in the potential address set; and (d) conveying the potential address set with the mobile telecommunication call to a call receiver.

It is, therefore, a feature of the-present invention to provide a system, apparatus and method for availing a mobile call of address information.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

For purposes of illustration, by way of example and not by way of limitation, the present invention will be discussed in the context of an emergency service network in the United States, commonly referred to as a 9-1-1 network. The teachings of the present invention are equally applicable, useful and novel in other special number calling systems, such as maintenance service networks, college campus security networks and other networks.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the context of this disclosure, the term "mobile phone" or "mobile calling instrument" or similar terms refers to any calling instruments whose geographic location may be changed by a user without cooperation by a carrier, or other service provider. By way of example and not by way of limitation, such mobile calling instruments may include cellular phones, Personal Digital Assistant (PDA) instruments, Voice over Internet Protocol (VoIP) instruments, Personal Communication System (PCS) instruments, and other similarly portable, wireless or mobile instruments.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
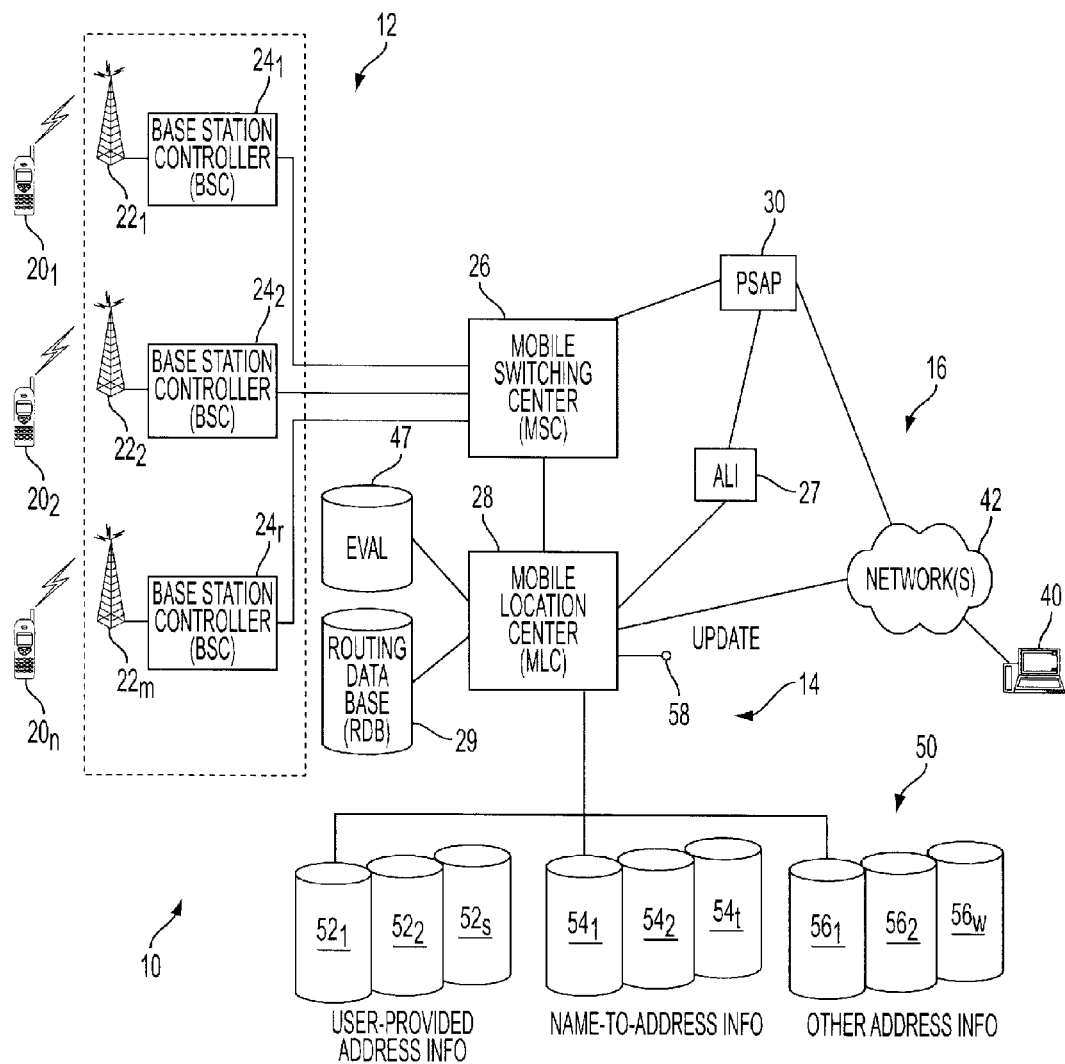
FIG. 1 is a schematic diagram illustrating a system employing the system of the present invention.

FIG. 1 is a schematic diagram illustrating a system employing the system of the present invention. In FIG. 1, a system 10 for handling wireless special number calls, such as wireless Emergency Service 9-1-1 calls, includes an originating wireless network section 12, a location section 14 and an originating Voice over Internet Protocol (VoIP) network section 16.

Originating wireless network section 12 includes a plurality of wireless phones $20_1$, $20_2$, $20_n$ in communication with a plurality of wireless communication antennas $22_1$, $22_2$, $22_m$ and an associated plurality of Base Station Controllers (BSC) $24_1$, $24_2$, $24_r$. Wireless phones $20_1$, $20_2$, $20_n$ may include, by way of example and not by way of limitation, cellular phones, personal digital assistant (PDA) instruments, personal communication system (PCS) instruments, and other similarly wireless calling instruments. Wireless network section 12 may be implemented in any configuration using any protocol or standard. In a preferred embodiment, wireless network 12 is implemented according to the Global System for Mobile Communications (GSM; also sometimes referred to as Groupe Speciale Mobile) standard. The indicators "n", "m" and "r" are employed to signify that there can be any number of wireless phones, wireless communication antennas and BSCs in originating wireless network section 10. The inclusion of three wireless phones $20_1$, $20_2$, $20_n$; three wireless communication antennas $22_1$, $22_2$, $22_m$ and three BSCs $24_1$, $24_2$, $24_r$ in FIG. 1 is illustrative only and does not constitute any limitation regarding the number of wireless phones, wireless communication antennas and BSCs that may be included in an originating wireless network section 12 in the present invention. Moreover, it is not required that the numbers of wireless phones, wireless communication antennas and BSCs be equal.

Originating wireless network section 12 also includes at least one Mobile Switching Center (MSC) 26 coupled with base station controllers (BSC) $24_1$, $24_2$, $24_r$.

Originating Voice over Internet Protocol (VoIP) network section 16 includes a VoIP calling instrument 40 and at least one network, network(s) 42, for routing a call to PSAP 30. Network(s) 42 includes the Internet, and may include other networks for interfacing the Internet with a communication network for presenting calls from calling instrument 40 to PSAP 30, as will be understood by one skilled in the art of VoIP calling systems and emergency services call networks. An evaluating unit 47 for receiving mobile calls from VoIP phone 40 is coupled within at least one network among network(s) 42.

Location section 14 includes a Mobile Location Center (MLC) 28. MLC 28 may be coupled with PSAP 30 via an Automatic Location Identification (ALI) unit 27. An associated Routing Data Base (RDB) 29 and an associated evaluating unit 47 are coupled with MLC 28 for use by MLC 28 in evaluating mobile calls from BSCs $24_1$, $24_2$, $24_r$ and determining location information (including address information) relating to a respective wireless phone $20_n$ or a respective VoIP phone 40. Address information relating to a calling instrument is useful in routing an emergency service call to a convenient and preferably proximate PSAP 30 for handling the emergency reported by the emergency service call. Identification of address information relating to a locus may also be useful, by way of example and not by way of limitation, to assist emergency responder personnel in rendering timely aid including locating children, elderly persons or other survivors in a fire, building collapse or other emergency situation.

Address information may be expressed in terms of an error indication relating to the location. By way of example and not by way of limitation, an error relating to a mobile phone or similar mobile calling instrument may be expressed in terms of a mobile error $E_{MOB}$ expressed as a radius about the locus of the mobile phone indicating that the locus may actually be somewhere within that radial distance with respect to the locus of the mobile phone. By way of further example and not by way of limitation, an error relating to an address may be expressed in terms of an address error $E_{ADD}$ expressed as a radius about the locus of the address indicating that the locus may actually be somewhere within that radial distance with respect to the address. See FIG. 4.

MLC 28 preferably embodies functions performed by other units known by those skilled in the art of telecommunication networks (not illustrated in FIG. 1) such as, by way of example and not by way of limitation, a Serving Mobile Location Center (SMLC), Position Determining Entity (PDE), a Gateway Mobile Location Center (GMLC), a Mobile Positioning Center (MPC), a Home Location Register (HLR) and a Visitors' Location Register (VLR).

Evaluating unit 47 evaluates incoming wireless calls to determine whether address information relating to the caller placing the respective extant wireless call is included with the extant wireless call. If the extant wireless call has accompanying address information, evaluating unit 47 (perhaps in cooperation with MSC 26 or MLC 28 or both MSC 26 and MLC 28) effects onward routing of the extant wireless call to a PSAP 30. Evaluating unit 47 also evaluates incoming VoIP calls whether address information relating to the caller placing the respective extant VoIP call is included with the extant VoIP call. If the extant VoIP call has accompanying address information, evaluating unit 47 (perhaps in cooperation with MSC 26 or MLC 28 or both MSC 26 and MLC 28) effects onward routing of the extant VoIP call to PSAP 30.

Location section 14 also includes a plurality of data bases 50 such as, by way of example and not by way of limitation, user-provided data base $52_1$, $52_2$, $52_s$, name-to-address data bases $54_1$, $54_2$, $54_t$ and other data bases $56_1$, $56_2$, $56_w$. The indicators "s", "t" and "w" are employed to signify that there can be any number of user-provided data bases, name-to-address data bases and other data bases in location section 14. The inclusion of three user-provided data bases $52_1$, $52_2$, $52_s$, three name-to-address data bases $54_1$, $54_2$, $54_t$ and three other data bases $56_1$, $56_2$, $56_w$ in FIG. 1 is illustrative only and does not constitute any limitation regarding the number of user-provided data bases, name-to-address data bases and other data bases that may be included in a location section in the present invention. User-provided data bases $52_1$, $52_2$, $52_s$ may contain, by way of example and not by way of limitation, information relating to addresses associated with respective callers and provide by the respective callers, such as home address, favorite coffee cafe, office, children's school or similar addresses likely to be frequented by the respective caller. Name-to-address data bases $54_1$, $54_2$, $54_t$ may include information relating a respective caller's name with an address such as, by way of example and not by way of limitation, driver's license information, property tax information, utility records and similar information. Other data bases $56_1$, $56_2$, $56_w$ are included in FIG. 1 to represent other data bases which may relate at least one caller-related data element accompanying a call with an associated address.

If the extant wireless call does not have accompanying address information, MLC 28 queries data bases 50 as necessary to obtain address information for accompanying the extant wireless call in its onward routing to PSAP 30. If evaluating unit 47 ascertains that no address information accompanies the extant wireless call, but an inquiry has been made of data bases 50, evaluating unit 47 (or evaluating unit 47 in cooperation with MSC 26) effects onward routing of the extant wireless call to a PSAP 30. If evaluating unit 47 ascertains that no address information accompanies the extant VoIP call, but an inquiry has been made of data bases 50, evaluating unit 47 effects onward routing of the extant VoIP call to a PSAP 30.

Figure 2:
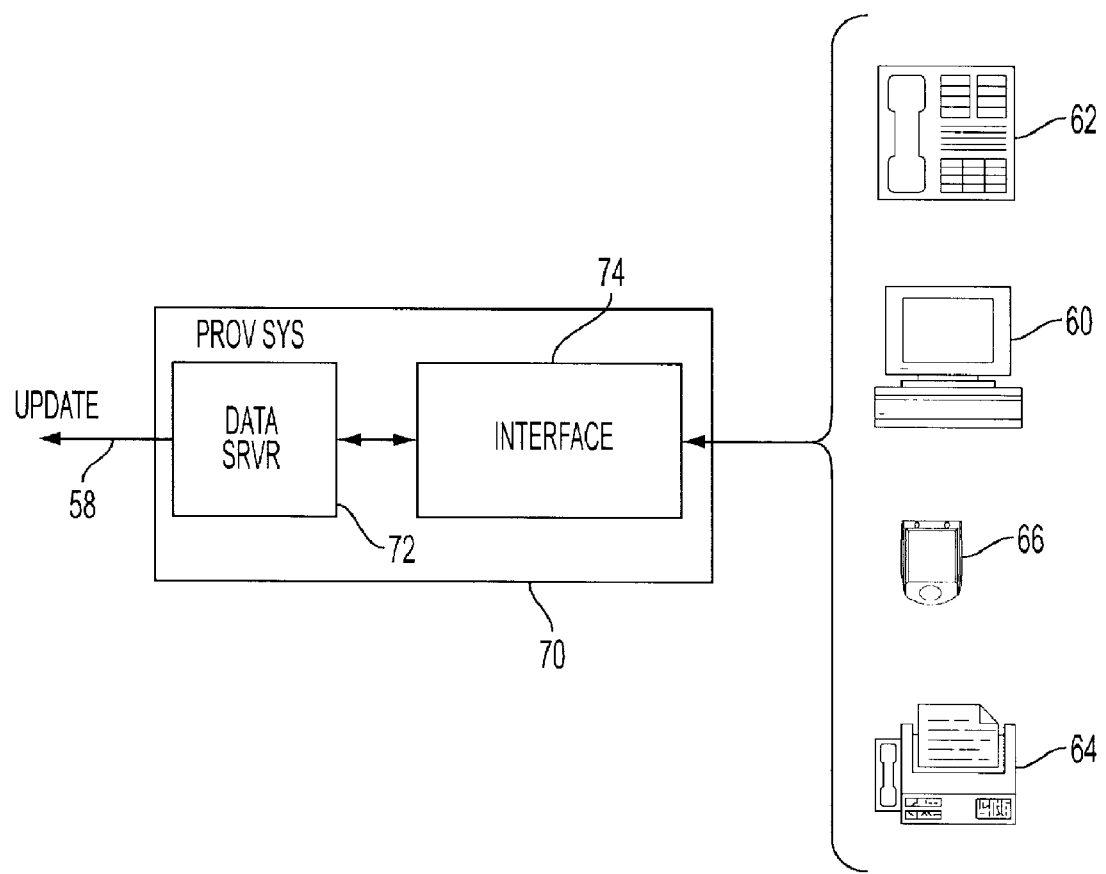
FIG. 2 is a schematic diagram illustrating various ways that address information may be updated in the system illustrated in FIG. 1.

FIG. 2 is a schematic diagram illustrating various ways that address information may be updated in the system illustrated in FIG. 1. In FIG. 2, a provisioning system 70 is configured for updating information in MLC 28 (FIG. 1) via an update port (or other communicating link) 58. Provisioning system 70 includes a data server unit 72 coupled with an interface unit 74.

Provisioning system 70 is coupled with a communications or update port 58 associated with MLC 28 (FIG. 1). An appropriate data base 50, such as by way of example and not by way of limitation an other data base $56_1$, $56_2$, $56_w$ (FIG. 1) can be updated for use by MLC 28 based on preferences set up by a home or business subscriber and submitted to provisioning system 70 via interface unit 74 by any of various communication technologies known to those skilled in the art of telecommunication system design. Such communication technologies may include, by way of example and not by way of limitation, a computer 60, a phone 62, a facsimile machine 64 and a PDA (Personal Digital Assistant) 66 or another communication device such as, by way of example and not by way of limitation, a smart phone (not shown in FIG. 2).

Figure 3:
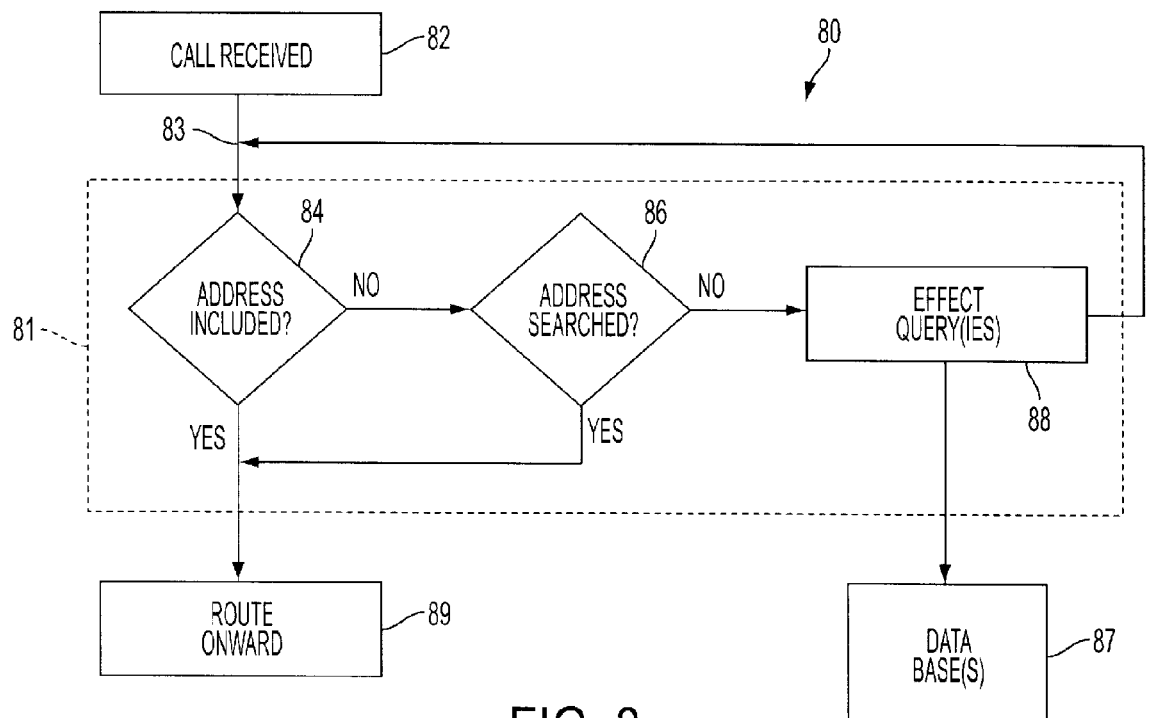
FIG. 3 is a schematic diagram illustrating operation of an apparatus according to the present invention that may be employed in the address evaluating unit of the system illustrated in FIG. 1.

FIG. 3 is a schematic diagram illustrating operation of an apparatus according to the present invention that may be employed in the address evaluating unit of the system illustrated in FIG. 1. In FIG. 3, an apparatus 80 receives an extant mobile call at an input locus 82. An evaluating unit 81 receives the call from input locus 82. Evaluating unit 81 includes a first query unit 84, a second query unit 86 and an inquiry unit 88. First query unit 84 poses a query whether address information is included with the extant call. If there is no address information included with the extant call, second query unit 86 poses a query whether an address information search has been effected regarding the extant call. If no address information search has been carried out regarding the extant call, then an address information search is carried out by inquiry unit 88 using data base(s) 87 (e.g., data bases 50; FIG. 1). Address information discovered in the search of data base(s) 87 is added to accompany the extant call. Apparatus 80 notes that an address information search was carried out regarding the extant call, as indicated by a connection between inquiry unit 88 and a locus 83.

If address information accompanies the extant call, the YES indication proceeds from first query unit 84 and the extant call is routed onward, as indicated by block 89. If an address information search has been carried out regarding the extant call, the YES indication proceeds from second query unit 86 and the extant call is routed onward, as indicated by block 89.

Figure 4:
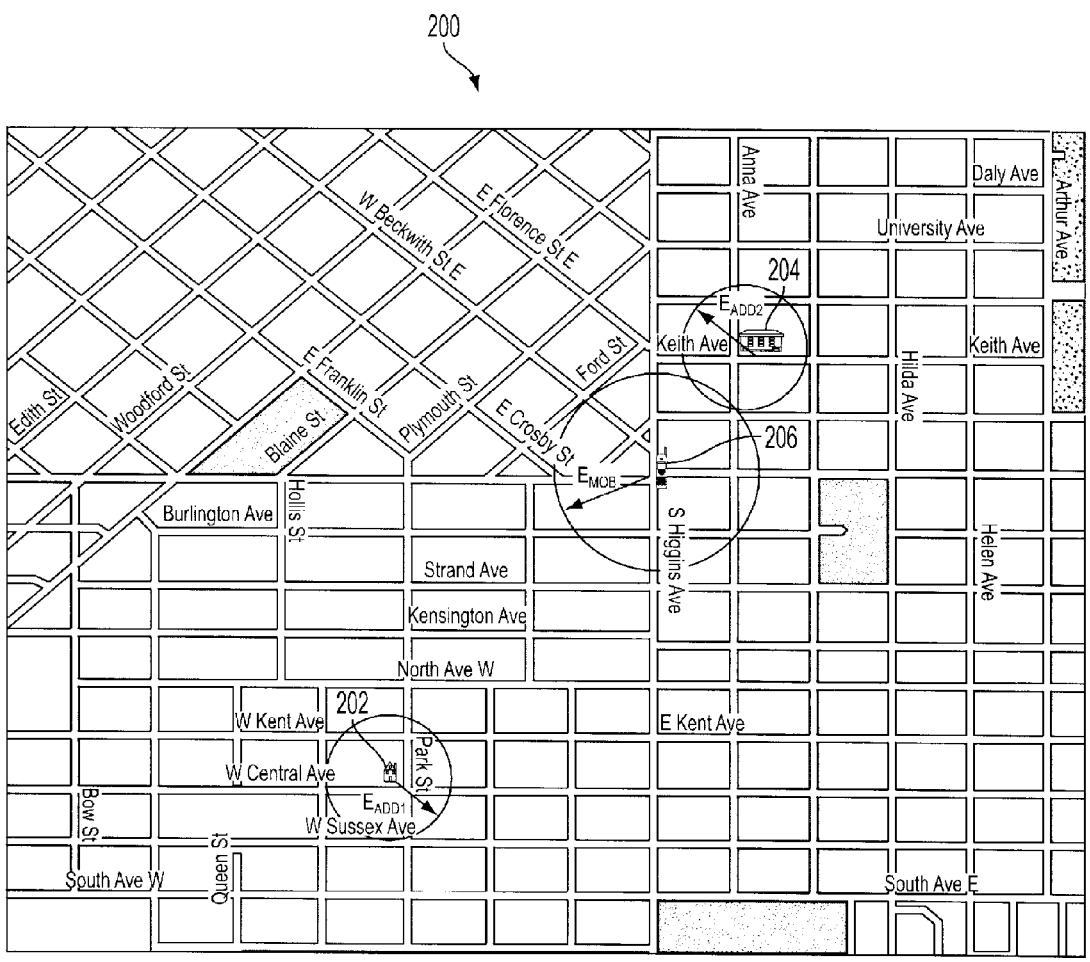
FIG. 4 is a schematic diagram illustrating operation of the method of the present invention in geographic terms.

FIG. 4 is a schematic diagram illustrating operation of the method of the present invention in geographic terms. In FIG. 4, a map 200 illustrates a portion of an urban area. North is presumed to be located at the top of map 200 in keeping with generally accepted tradition. A mobile phone user may have a residence or home 202 situated at the northwest corner of West Central Avenue and Park Street. The mobile phone user may work at an office 204 situated at the northeast corner of Keith Avenue and Anna Avenue. The mobile phone user may appear to be traveling between home 202 and office 204 with his mobile phone 206 at the corner of Evans Avenue and Higgins Avenue.

Home 202 has an address error $E_{ADD1}$ expressed in terms of a radius of error in FIG. 4. Office 206 has an address error $E_{ADD2}$ expressed in terms of a radius of error in FIG. 4. Address errors may be affected by any of several factors including by way of example and not by way of limitation, the environment surrounding the address such as whether the address is on a hill or in a valley, whether other buildings are proximate to or distal from the address, whether there are electromagnetic transmitters near the address, and other factors. Expressing address error $E_{ADD1}$ as a radius centered substantially at home 202 indicates that the locus of an address indicator relating to home 202 may actually be somewhere within that radial distance $E_{ADD1}$ of home 202. Expressing address error $E_{ADD2}$ as a radius centered substantially at office 204 indicates that the locus of an address indicator relating to office 204 may actually be somewhere within that radial distance $E_{ADD2}$ of office 204.

Mobile phone 206 has a mobile error $E_{MOB}$ expressed as a radius of error in FIG. 4. Mobile factors may be affected by any of several factors such as, by way of example and not by way of limitation, the transmitting power performance of the mobile phone, the receiving sensitivity of the mobile phone and other factors. Expressing mobile error $E_{MOB}$ as a radius centered substantially at mobile phone 206 indicates that the locus of a location indicator relating to mobile phone 206 may actually be somewhere within that radial distance $E_{MOB}$ of mobile phone 206. Radii of error $E_{ADD1}$, $E_{ADD2}$, $E_{MOB}$ may have different magnitudes because sources for error among the methods for determining each respective location 202, 204, 206 may differ and may have different sources of error.

When an address error area circumscribed by a circle of a radius established by an address error $E_{ADD1}$, $E_{ADD2}$ overlaps a mobile error area circumscribed by a circle of a radius established by an address error $E_{MOB}$ then an address associated with an overlapped address error area may be a candidate for the location address for the mobile phone associated with an overlapping mobile error area. In FIG. 4, mobile phone 206 has a mobile error area circumscribed by a circle of a radius $E_{MOB}$, home 202 has an address error area circumscribed by a circle of a radius $E_{ADD1}$, and office 204 has an address error area circumscribed by a circle of a radius $E_{ADD2}$. The mobile error area associated with mobile phone 206 overlaps the address error area associated with office 204. As a result, there may be a presumption that mobile phone 206 is located at office 204. If more than one address error area is overlapped by the mobile error area, the greater-overlapped address error area may be a more likely selection for the address at which mobile phone 206 is located.

A mobile phone user may, by way of example and not by way of limitation, subscribe to a service that permits registration of addresses at which the mobile phone user may be situated. By way of further example and not by way of limitation, a subscribing mobile phone user may register addresses relating to his home, his office, a favorite coffee shop and a favorite book store. When the subscribing mobile phone user places an emergency service 9-1-1 call the present invention may aid in determining whether the call is placed from a known (i.e., registered) address and which address, based upon overlapping of mobile error $E_{MOB}$ and registered addresses $E_{ADD1}$, $E_{ADD2}$, ... $E_{ADDn}$ associated with the extant mobile emergency service call.

Figure 5:
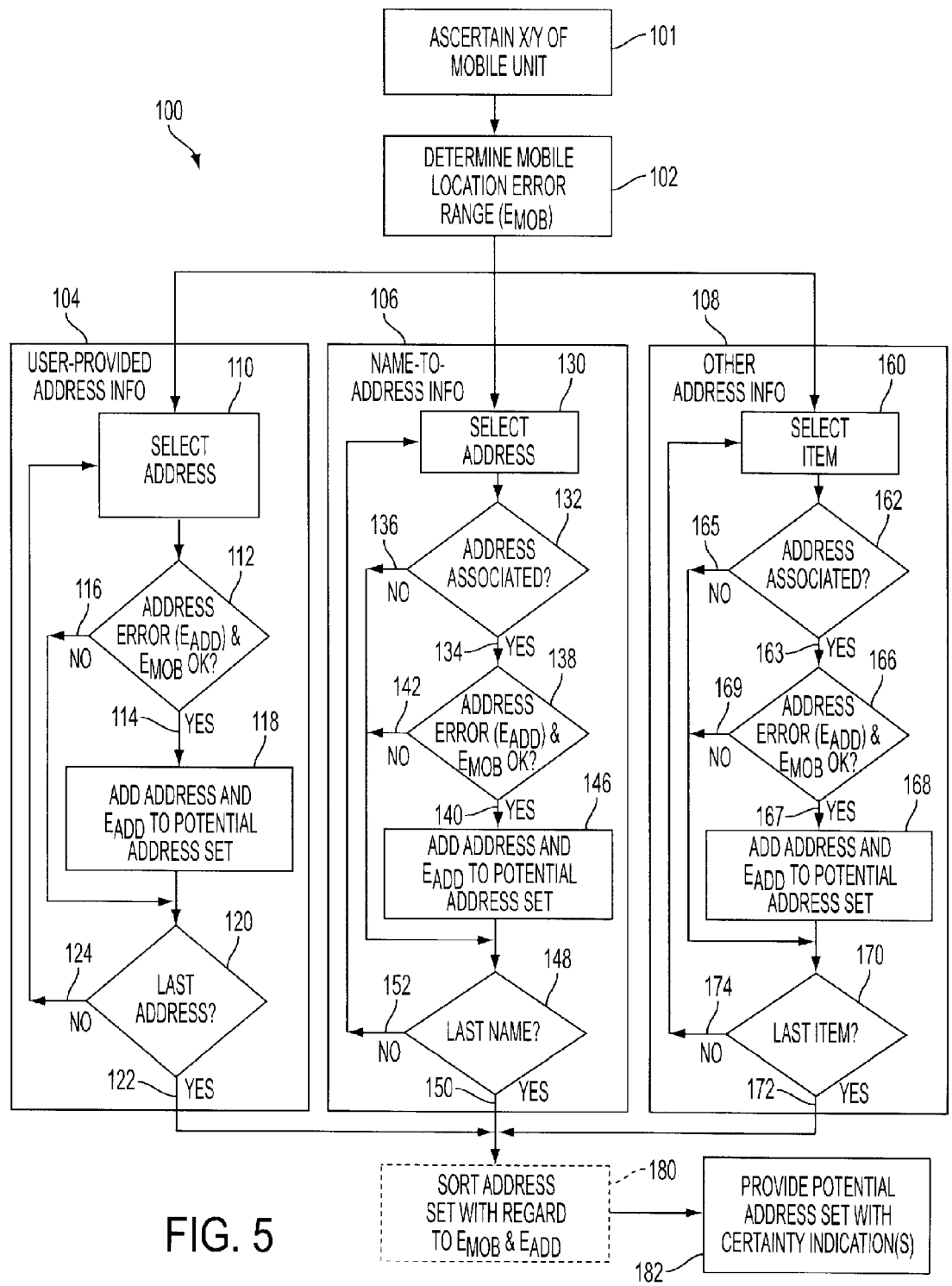
FIG. 5 is a flow diagram illustrating a first representation of the method of the present invention.

FIG. 5 is a flow diagram illustrating a first representation of the method of the present invention. In FIG. 5, a method 100 for availing a mobile telecommunication call of a potential address set including address information relating to a caller locus begins with ascertaining an indication of the X/Y location of a calling mobile unit, as indicate by a block 101. X/Y location may be expressed in terms of Geocoding, latitude/longitude, Loran coordinates or another expression of geographic location of the calling mobile unit.

Method 100 continues with ascertaining a mobile location error range ($E_{MOB}$) associated with the location information accompanying the extant call, as indicated by a block 102. $E_{MOB}$ may be predetermined and may accompany location information, may be assigned by a receiving unit based upon predetermined characteristics (e.g., type of calling unit, local weather conditions, location of receiving station such as on a hill, or other factors) or may be determined by other criteria.

Method 100 continues by addressing one or more data bases to inquire regarding address information relating to the X/Y information received (block 101). In the representative execution of the method of the present invention—method 100—three data bases are addressed: a user-provided address data base 104, a name-to-address data base 106 and another data base 108.

With regard to user-provided address data base 104, method 100 selects an address, as indicated by a block 110. Each address in user-provided address data base 104 has an associated address error $E_{ADD}$. $E_{ADD}$ may be predetermined and may accompany address information retrieved from user-provided address data base 104. $E_{ADD}$ may be assigned by a system planner, by way of example and not by way of limitation, based upon predetermined characteristics (e.g., location of address station such as on a hill, among tall buildings or other factors) or may be determined by other criteria. Address errors may also be affected by inaccuracies in base map data reflecting deviations of map-indicated positions compared with actual positions. A query is posed whether $E_{MOB}$ and $E_{ADD}$ effect an overlap, as indicated by a query block 112. If $E_{MOB}$ and $E_{ADD}$ do not effect an overlap, method 100 proceeds from query block 112 via a NO response line 116 and method 100 proceeds to a query block 120 by which a query is posed whether the extant address is the last address in user-provided address data base 104. If the extant selected address is not the last address in user-provided address data base 104, method 100 proceeds from query block 120 via a NO response line 124 to return to block 110 to select another address and proceed further from block 110 as described here.

If $E_{MOB}$ and $E_{ADD}$ do effect an overlap, method 100 proceeds from query block 112 via a YES response line 114 and the extant address is added to a potential address set, along with its respective address error $E_{ADD}$, as indicated by a block 118. Method 100 proceeds from block 118 to query block 120 by which a query is posed whether the extant address is the last address in user-provided address data base 104. If the extant address is not the last address in user-provided address data base 104, method 100 proceeds from query block 120 via a NO response line 124 to return to block 110 to select another address and proceed further from block 110 as described here. If the extant address is the last address in user-provided address data base 104, method 100 proceeds from query block 120 via a YES response line 122.

With regard to name-to-address data base 106, method 100 selects a name, as indicated by a block 130. A query is then posed whether the extant selected name has an associated address, as indicated by a query block 132. If the extant name does not have an associated address, method 100 proceeds from query block 132 via a NO response line 136 and method 100 proceeds to a query block 148 by which a query is posed whether the extant name is the last name in name-to-address data base 106. If the extant name is not the last name in name-to-address data base 106, method 100 proceeds from query block 148 via a NO response line 152 to return to block 130 to select another name and proceed further from block 130 as described here.

Each address in name-to-address data base 106 has an associated address error $E_{ADD}$. $E_{ADD}$ may be predetermined and may accompany address information retrieved from name-to-address data base 106. $E_{ADD}$ may be assigned by a system planner, by way of example and not by way of limitation, based upon predetermined characteristics (e.g., location of address station such as on a hill, among tall buildings or other factors) or may be determined by other criteria. A query is posed whether $E_{MOB}$ and $E_{ADD}$ effect an overlap, as indicated by a query block 138. If $E_{MOB}$ and $E_{ADD}$ do not effect an overlap, method 100 proceeds from query block 138 via a NO response line 142 and method 100 proceeds to query block 148 by which a query is posed whether the extant name is the last name in name-to-address address data base 106. If the extant name is not the last name in name-to-address data base 106, method 100 proceeds from query block 148 via NO response line 152 to return to block 130 to select another name and proceed further from block 130 as described here.

If $E_{MOB}$ and $E_{ADD}$ do effect an overlap, method 100 proceeds from query block 138 via a YES response line 140 and the extant address is added to a potential address set, along with its respective address error $E_{ADD}$, as indicated by a block 146. Method 100 proceeds from block 146 to query block 148 by which a query is posed whether the extant name is the last name in name-to-address data base 106. If the extant name is not the last name in name-to-address data base 106, method 100 proceeds from query block 148 via NO response line 152 to return to block 130 to select another name and proceed further from block 130 as described here. If the extant name is the last name in name-to-address data base 106, method 100 proceeds from query block 148 via a YES response line 150.

With regard to other address info data base 108, method 100 selects an item, as indicated by a block 160. A query is then posed whether the extant selected item has an associated address, as indicated by a query block 162. If the extant item does not have an associated address, method 100 proceeds from query block 162 via a NO response line 165 and method 100 proceeds to a query block 170 by which a query is posed whether the extant item is the last item in other address info data base 108. If the extant item is not the last item in other address info data base 108, method 100 proceeds from query block 170 via a NO response line 174 to return to block 160 to select another item and proceed further from block 160 as described here.

Each address in other address info data base 108 has an associated address error $E_{ADD}$. $E_{ADD}$ may be predetermined and may accompany address information retrieved from other address info data base 108. $E_{ADD}$ may be assigned by a system planner, by way of example and not by way of limitation, based upon predetermined characteristics (e.g., location of address station such as on a hill, among tall buildings or other factors) or may be determined by other criteria. A query is posed whether $E_{MOB}$ and $E_{ADD}$ effect an overlap, as indicated by a query block 166. If $E_{MOB}$ and $E_{ADD}$ do not effect an overlap, method 100 proceeds from query block 166 via a NO response line 169 and method 100 proceeds to query block 170 by which a query is posed whether the extant item is the last item in other address info data base 108. If the extant item is not the last item in other address info data base 108, method 100 proceeds from query block 170 via NO response line 174 to return to block 160 to select another item and proceed further from block 160 as described here.

If $E_{MOB}$ and $E_{ADD}$ do effect an overlap, method 100 proceeds from query block 166 via a YES response line 167 and the extant address is added to a potential address set, along with its respective address error $E_{ADD}$, as indicated by a block 168. Method 100 proceeds from block 168 to query block 170 by which a query is posed whether the extant item is the last item in other address info data base 108. If the extant item is not the last item in other address info data base 108, method 100 proceeds from query block 170 via NO response line 174 to return to block 160 to select another item and proceed further from block 160 as described here. If the extant item is the last item in other address info data base 108, method 100 proceeds from query block 170 via a YES response line 172.

Figure 6:
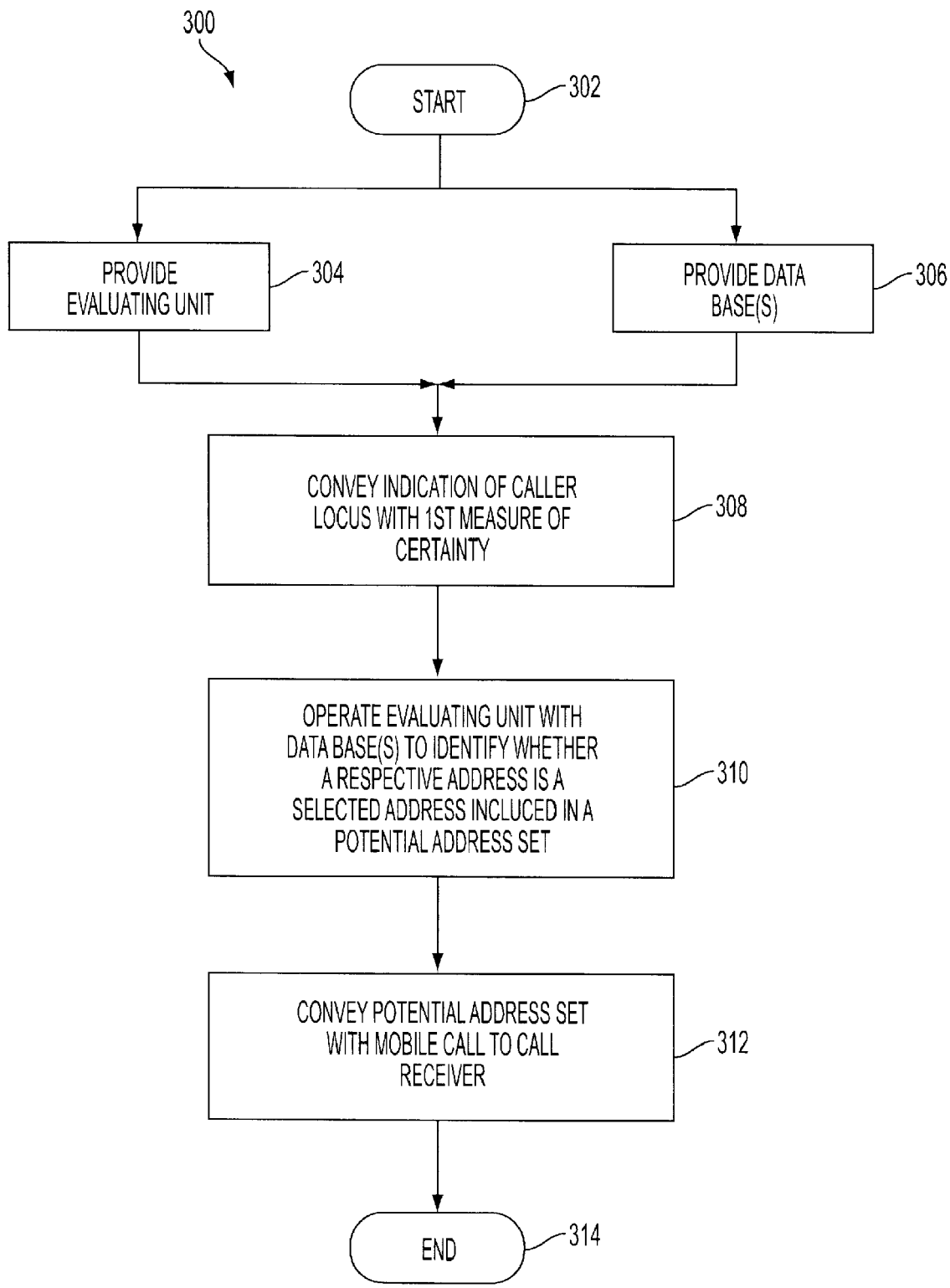
FIG. 6 is a flow diagram illustrating a second representation of the method of the present invention.

FIG. 6 is a flow diagram illustrating a second representation of the method of the present invention. In FIG. 6, a method 300 begins at a START locus 302. Method 300 continues by, in no particular order: (1) providing an evaluating unit configured for receiving the mobile telecommunication call from a caller at the caller locus, as indicated by a block 304; and (2) providing at least one data base coupled with the evaluating unit, as indicated by a block 306. The at least one data base contains address location information relating with at least one address associated with the caller. Each respective address of the at least one address is situated at a respective address locus. The address location information includes a respective second measure of certainty associated with each respective address of the at least one address.

Method 300 continues with conveying an indication of the caller locus with the mobile telecommunication call, as indicated by a block 308. The indication includes a first measure of certainty associated with the caller locus.

Method 300 continues with operating the evaluating unit cooperatively with the at least one data base to identify whether at least one respective address is a selected address, as indicated by a block 310. The selected address satisfies a predetermined relationship between the first measure of certainty and the respective second measure of certainty. Each selected address is included in the potential address set.

Method 300 continues with conveying the potential address set with the mobile telecommunication call to a call receiver, as indicated by a block 312. Method 300 terminates at an END locus 314.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims:

The invention claimed is:

1. A system for availing a mobile telecommunication call of a potential address set including address information relating to a caller locus; the system comprising:
   (a) an evaluating unit configured for evaluating said mobile telecommunication call received from a caller at said caller locus; an indication of said caller locus being conveyed with said mobile telecommunication call; said indication including a first measure of certainty associated with said caller locus; and
   (b) at least one data base coupled with said evaluating unit; said at least one data base containing address location information relating with at least one address associated with said caller; each respective address of said at least one address being situated at a respective address locus; said address location information including a respective second measure of certainty associated with each respective address of said at least one address;
   said evaluating unit ascertaining whether said potential address set accompanies said mobile telecommunication call; when said potential address set does not accompany said mobile telecommunication call said evaluating unit ascertains whether a previous query regarding a potential address set has been made; when no potential address set accompanies said mobile telecommunication call and no previous query regarding a potential address set has been made, said evaluating unit cooperates with said at least one data base to identify whether at least one said respective address is a selected address; said selected address satisfying a predetermined relationship between said first measure of certainty and said respective second measure of certainty; each said selected address being included in said potential address set; said potential address set being conveyed with said mobile telecommunication call to a call receiver.

2. A system for availing a mobile telecommunication call of a potential address set including address information relating to a caller locus as recited in claim 1 wherein said indication of said caller locus is expressed in terms of a two-dimensional geographic reference system.

3. A system for availing a mobile telecommunication call of a potential address set including address information relating to a caller locus as recited in claim 1 wherein said first measure of certainty is expressed in terms of a radial distance from said caller locus within which said caller may be situated.

4. A system for availing a mobile telecommunication call of a potential address set including address information relating to a caller locus as recited in claim 1 wherein said address location information is expressed in terms of a two-dimensional geographic reference system.

5. A system for availing a mobile telecommunication call of a potential address set including address information relating to a caller locus as recited in claim 1 wherein said second measure of certainty is expressed in terms of a radial distance from said address locus within which said address may be situated.

6. A system for availing a mobile telecommunication call of a potential address set including address information relating to a caller locus as recited in claim 1 wherein said at least one data base includes at least one of at least one first data base including user-provided address information, at least one second data base including name-to-address linking information and at least one third data base containing other address information.

7. A system for availing a mobile telecommunication call of a potential address set including address information relating to a caller locus as recited in claim 2 wherein said first measure of certainty is expressed in terms of a radial distance from said caller locus within which said caller may be situated.

8. A system for availing a mobile telecommunication call of a potential address set including address information relating to a caller locus as recited in claim 7 wherein said address location information is expressed in terms of a two-dimensional geographic reference system.

9. A system for availing a mobile telecommunication call of a potential address set including address information relating to a caller locus as recited in claim 8 wherein said second measure of certainty is expressed in terms of a radial distance from said address locus within which said address may be situated.

10. A system for availing a mobile telecommunication call of a potential address set including address information relating to a caller locus as recited in claim 9 wherein said at least one data base includes at least one of at least one first data base including user-provided address information, at least one second data base including name-to-address linking information and at least one third data base containing other address information.

11. A system for availing a mobile telecommunication call of a potential address set; said mobile telecommunication call originating from a caller at a caller locus; said potential address set including address information relating with at least one address associated with a user identified in connection with a calling instrument employed for placing said mobile telecommunication call; the system comprising:
(a) an evaluating unit configured for evaluating said mobile telecommunication call; an indication of said caller locus being conveyed with said mobile telecommunication call; said indication including a first measure of certainty associated with said caller locus; and
(b) at least one data base coupled with said evaluating unit; said at least one data base containing said address location information; each respective address of said at least one address being situated at a respective address locus; said address location information including a respective second measure of certainty associated with each respective address of said at least one address;
said evaluating unit ascertaining whether said potential address set accompanies said mobile telecommunication call; when said potential address set does not accompany said mobile telecommunication call said evaluating unit ascertains whether a previous query regarding a potential address set has been made; when no potential address set accompanies said mobile telecommunication call and no previous query regarding a potential address set has been made, said evaluating unit cooperates with said at least one data base to identify whether at least one said respective address is a selected address; said selected address satisfying a predetermined relationship between said first measure of certainty and said respective second measure of certainty; each said selected address being included in said potential address set; said potential address set being conveyed with said mobile telecommunication call to a call receiver.

12. A system for availing a mobile telecommunication call of a potential address set as recited in claim 11 wherein said indication of said caller locus is expressed in terms of a two-dimensional geographic reference system.

13. A system for availing a mobile telecommunication call of a potential address set as recited in claim 12 wherein said first measure of certainty is expressed in terms of a radial distance from said caller locus within which said caller may be situated.

14. A system for availing a mobile telecommunication call of a potential address set as recited in claim 13 wherein said address location information is expressed in terms of a two-dimensional geographic reference system.

15. A system for availing a mobile telecommunication call of a potential address set as recited in claim 14 wherein said second measure of certainty is expressed in terms of a radial distance from said address locus within which said address may be situated.

16. A system for availing a mobile telecommunication call of a potential address set as recited in claim 15 wherein said at least one data base includes at least one of at least one first data base including user-provided address information, at least one second data base including name-to-address linking information and at least one third data base containing other address information.

17. A method for availing a mobile telecommunication call of a potential address set including address information relating to a caller locus; the method comprising:
(a) in no particular order:
(1) providing an evaluating unit configured for evaluating said mobile telecommunication call from a caller at said caller locus; and
(2) providing at least one data base coupled with said evaluating unit; said at least one data base containing address location information relating with at least one address associated with said caller; each respective address of said at least one address being situated at a respective address locus; said address location information including a respective second measure of certainty associated with each respective address of said at least one address;
(b) conveying an indication of said caller locus with said mobile telecommunication call; said indication including a first measure of certainty associated with said caller locus;
(c) operating said evaluating unit:
(1) to ascertain whether said potential address set accompanies said mobile telecommunication call;
(2) when said potential address set does not accompany said mobile telecommunication call, operating said evaluating unit to ascertain whether a previous query regarding a potential address set has been made; and
(3) when no potential address set accompanies said mobile telecommunication call and no previous query regarding a potential address set has been made, operating said evaluating unit cooperatively with said at least one data base to identify whether at least one said respective address is a selected address; said selected address satisfying a predetermined relationship between said first measure of certainty and said respective second measure of certainty; each said selected address being included in said potential address set; and (d) conveying said potential address set with said mobile telecommunication call to a call receiver.

18. A method for availing a mobile telecommunication call of a potential address set including address information relating to a caller locus as recited in claim 17 wherein said indication of said caller locus is expressed in terms of a two-dimensional geographic reference system, and wherein said address location information is expressed in terms of a two-dimensional geographic reference system.

19. A method for availing a mobile telecommunication call of a potential address set including address information relating to a caller locus as recited in claim 18 wherein said first measure of certainty is expressed in terms of a radial distance from said caller locus within which said caller may be situated, and wherein said second measure of certainty is expressed in terms of a radial distance from said address locus within which said address may be situated.

20. A method for availing a mobile telecommunication call of a potential address set including address information relating to a caller locus as recited in claim 19 wherein said at least one data base includes at least one of at least one first data base including user-provided address information, at least one second data base including name-to-address linking information and at least one third data base containing other address information.

* * * * *